US008453136B1

(12) United States Patent  
Hahn et al.

(10) Patent No.: US 8,453,136 B1
(45) Date of Patent: May 28, 2013

(54) CHANGE TRACKING AND INCREMENTAL SYNCHRONIZATION OF EDA DESIGN AND TECHNOLOGY DATA

(75) Inventors: Mark Steven Hahn, Fremont, CA (US); Arnold Ginetti, Antibes (FR)

(73) Assignee: Cadence Design Systems, Inc., San Jose, CA (US)

( * ) Notice: Subject to any disclaimer, the term of this patent is extended or adjusted under 35 U.S.C. 154(b) by 1575 days.

(21) Appl. No.: 11/682,852

(22) Filed: Mar. 6, 2007

(51) Int. Cl.
G06F 9/44 (2006.01)
G06F 9/45 (2006.01)
G06F 17/50 (2006.01)

(52) U.S. Cl.
USPC ............... 717/168; 716/100; 716/105

(58) Field of Classification Search
USPC ........................................... 717/168
See application file for complete search history.

(56) References Cited

U.S. PATENT DOCUMENTS

| | | | |
|---|---|---|---|
| 6,766,506 B1* | 7/2004 | Ratzlaff et al. | 716/115 |
| 7,065,476 B2* | 6/2006 | Dessureault et al. | 703/2 |
| 7,913,194 B1* | 3/2011 | Baylor | 716/122 |
| 7,992,132 B2* | 8/2011 | Fernando et al. | 717/120 |
| 8,073,924 B2* | 12/2011 | Sitaraman et al. | 709/213 |
| 2002/0059299 A1* | 5/2002 | Spaey | 707/104.1 |
| 2003/0065826 A1* | 4/2003 | Skufca et al. | 709/315 |
| 2003/0079180 A1* | 4/2003 | Cope | 715/511 |
| 2005/0044145 A1* | 2/2005 | Quinn et al. | 709/205 |
| 2006/0117073 A1* | 6/2006 | Bosworth et al. | 707/201 |
| 2007/0038642 A1* | 2/2007 | Durgin et al. | 707/10 |
| 2007/0088707 A1* | 4/2007 | Durgin et al. | 707/10 |
| 2008/0234987 A1* | 9/2008 | Haley | 703/1 |
| 2011/0246997 A1* | 10/2011 | Sitaraman et al. | 718/103 |

OTHER PUBLICATIONS

Mervyn et al., "Developing distributed applications for integrated prodcut and process design", pp. 679-689, Jul. 2003, retrived from <http://119.93.223.179/ScienceDirect/Computer-Aided%20Design/Computer-Aided%20Design%20Volume%202004/Computer-Aided%20Design%20Volume%202004%20Issue%20-%20(8)/sdarticle_004.pdf>.*

Mark Bales, "Facilitating EDA Flow Interoperability with the OpenAccess Design Database" 2003, retrieved from <http://www.eda.org/edps/edp03/submissions/paperMarkBales.pdf> total pages: 8.*

Benini et al., "Distributed EDA tool integration: the PPP paradigm", 1996, retrieved from <http://icwww.epfl.ch/~demichel/publications/archive/1996/ICCDconf96pg448.pdf>, total pages: 6.*

Mark Bales, "Facilitating EDA Flow Interoperability with the OpenAccess Design Database," 2003.

Blanchard et al., "The OpenAccess coalition—the drive to an open industry standard information model, API, and reference implementation for IC design data," Proceedings. International Symposium on Quality Electronic Design, 2002.

Guiney et al., "An introduction to openaccess an open source data model and API for IC design," Asia and South Pacific Conference on Design Automation, 2006, Jan. 2006.

(Continued)

*Primary Examiner* — Don Wong
*Assistant Examiner* — Marina Lee
(74) *Attorney, Agent, or Firm* — Vista IP Law Group, LLP

(57) ABSTRACT

A method and an apparatus are described for allowing several different applications to incrementally collaborate while making changes to a circuit design.

20 Claims, 6 Drawing Sheets

OTHER PUBLICATIONS

Cottrell et al., "Interoperability beyond design: sharing knowledge between design and manufacturing," Proceedings. Fourth International Symposium on Quality Electronic Design, Mar. 2003.
Darringer et al., "Design Systems Evolution and the Need for a Standard Data Model," 2003.
Nazifi, K., "CDN LIVE, OpenAccess Technical Panel," Sep. 2005.
Horgan, J., "New Physical Verification System from Cadence," http://www10.edacafe.com/nbc/articles/view_weekly.php?section=Magazine&articleid=209434&printerfriendly=1, Sep. 2005.
Levitt, M., "Cadence Physical Verification System," CDNLive!, Sep. 2005.
"Cadence Encounter Digital IC Design Platform: Digital Implementation of Nanometer ICs" 2005.
"Cell-Based IC Physical Design and Verification—SOC Encounter," CIC, Jul. 2004.
Sufen, W., "SoC Encounter Provides Smart Solution for 90nm Dragon-Ball Chip," CDNLive!, 2005.

* cited by examiner

CHANGE TRACKING AND INCREMENTAL SYNCHRONIZATION OF EDA DESIGN AND TECHNOLOGY DATA

BACKGROUND

Historically, different applications involved in a chip design flow were invoked serially. Each application would read the entire description of a design from one or more files on disk, make changes, and then write the entire design back to disk.

This approach greatly limits the ability for applications to collaborate on incremental changes to the design. For example, often one application is responsible for analyzing the design, while another application is responsible for changing it based on the results of the analysis. For large designs, the overhead of reading and writing the entire design can be substantial compared to the time required to analyze to make small changes or to analyze the effect of those changes. With the serial approach, both applications need to read the entire design. When multiple iterations of analysis and change are required to converge on an acceptable solution, another significant inefficiency arises because both applications start from scratch on each iteration, processing the whole design every time, rather than exploiting information about the incremental series of changes that have been made to process only the parts of the design that are impacted by the changes.

A more recent trend has been to consolidate several applications that need to collaborate into a single monolithic application, and to modify the algorithms previously implemented in separate applications to collaborate incrementally on a single in-memory representation within the monolithic application. This approach offers some advantages over a serial flow, but poses many other challenges. For example when the collaborating applications are from different companies, there can be fundamental business and/or technical obstacles preventing the underlying technologies from being combined into a single application. Even if the collaborating applications are all from the same company, merging technologies can be very time-consuming, and the integration difficulties grow dramatically as the size of the monolithic application increases. A fundamental limitation of the monolithic application approach is that it precludes dividing the problem up into smaller pieces that can be distributed among multiple processors in a server farm.

In one related art, a physical verification system incrementally shares some information about analysis results between a set of distributed processes. In another related art, automated routing software can partition a routing problem among a set of distributed processes, and integrate the resulting routes back into the main representation of the design. However, the implementation is specific to a particular representation of the routing data shared by both the master and slave processes, and that the slave processes operate in a batch mode, returning results only as their task.

With previous approaches based on multiple applications, whenever one application made changes and needed to pass the updated design to another application, the entire design had to be saved to disk by the first application and read by the second application. With previous approaches based on consolidating multiple applications into a monolithic application, it was not possible to distribute the work among multiple processes running on different machines. Therefore, there is a need for an improved method and mechanism to provide a distributed approach.

SUMMARY

This invention overcomes the shortcomings and limitations of prior approaches by allowing several different applications to incrementally collaborate while making changes to a design. An important objective of this invention is to provide a general-purpose infrastructure for a set of distributed processes to coordinate their changes to a design.

One implementation enables sharing just the changes. In another implementation, the changes are shared using a variety of protocols that can be substantially faster than disk I/O.

In one embodiment, the present invention enables collaboration between multiple processes, running on the same or different machines, based on the same application code or different applications from multiple companies.

According to other embodiments of the invention, they describe an extensible mechanism for incrementally synchronizing several different representations of design or technology data to reflect changes made to any of those representations. In one embodiment, the present invention has the ability to support incremental collaboration among multiple heterogeneous applications. In another embodiment, the present invention has the ability to support synchronization of multiple heterogeneous representations of EDA design and technology data.

In one embodiment, synchronizing is performed to the in-memory representation of the same design or technology in two or more collaborating processes, as changes are made in any of the processes. The in-memory representations can be the same format (e.g., the OpenAccess (OA) database), or different formats (e.g., between OA and a proprietary application-specific database). Information about OA can be found online at "http://www.cadence.com/partners/industry initiatives/openaccess/index.aspx" and "http://www.si2.org/?page=69."

In another embodiment, synchronizing is performed to the in-memory representations of different parts of the same design across some or all of the processes in a distributed system, where the design has been partitioned and some of the processes operate on a subset of the design data. Changes made by any of the distributed processes are applied incrementally to the primary representation of the whole design, and relevant changes are shared among several processes that operate on related subsets of the design.

In another embodiment, changes to a design are tracked by a standalone application, and are applied later to a different representation of the same design.

In a further embodiment, changes made to one version of a design are tracked and applied to a different version of the design, where the two versions of the design differ in ways that are not related to the changes.

In another embodiment, the mechanism includes a plug-in architecture offering flexibility in tracking the changes that are being made, exporting changes to be synchronized and importing changes and applying them.

In one embodiment of the invention, the tracking plug-in accumulates a set of changes made to the in-memory representation of an OpenAccess database, representing each change as an in-memory data structure. The export plug-in converts the data structures into an XML format and transmits that using a socket protocol to import plug-ins in one or more other processes participating in a multi-process session. Each import plug-in interprets the XML format and applies the set of changes to the in-memory representation of the same OpenAccess database in that process, synchronizing the view that all of the processes in the session have of the database. The implementation of each of the plug-ins, the change set data structures, and the XML format are extensible to allow tracking changes to other application data in addition to changes to OpenAccess.

Many variations on this embodiment are supported without changing any application code, by simply substituting different implementations of some or all of the plug-ins. Other methods and additional objects, features, and advantages of the invention are described in the detailed description, figures, and claims.

DETAILED DESCRIPTION

The present invention is directed to synchronization of changes to design and technology data. When changes are made within a given process to the data models used by applications in areas such as electronic design automation (EDA), it may make corresponding changes in other processes that are running at the same time. Making changes consistently in several different processes allows all of the processes to have a consistent view of the current state of the design data.

Figure 1:
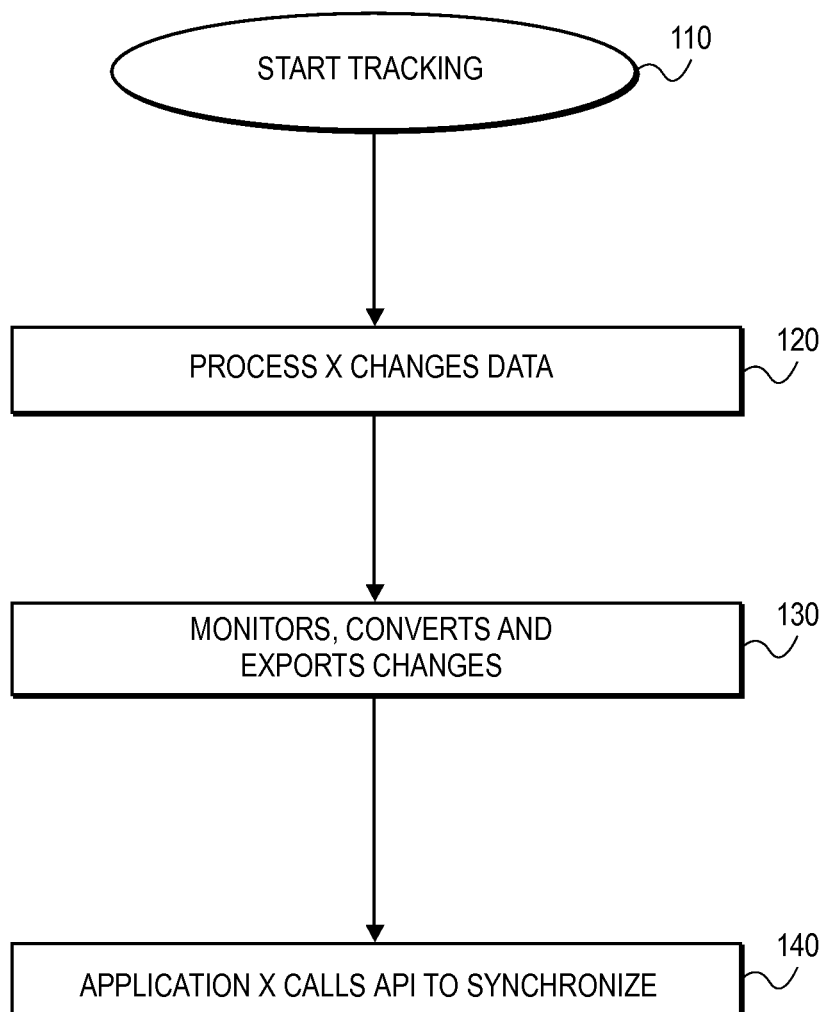
FIG. 1 shows a flowchart of a process for synchronizing data by an application and its process according to an embodiment of the invention.

FIG. 1 shows a flowchart 100 of a process for synchronizing data by an application and its process according to an embodiment of the invention.

The process includes start tracking 110, a process changes data 120, a tracking plug-in 130 creates the changes, and the application calls the application programming interface (API) to synchronize the changes 140.

At 110, tracking of changes is started. In an embodiment, the changes that are tracked include information that is part of an electronic design data model such as the OpenAccess data model. In another embodiment, changes to other design representations are tracked. In a further embodiment, a tool kit is used to relate application-specific data models and OpenAccess data models. In one embodiment, the process of tracking and synchronizing changes is started by a user. In another embodiment, the process of tracking and synchronizing changes is automatically performed by a system.

At 120, data is modified within a given process running application X. In one embodiment, the data is changed by the user, for example through an interactive editor. In another embodiment, the data is changed by the system or automatic updates. In a further embodiment, the data is changed under the direction of another application or process. Other ways to change the data are also possible.

At 130, the tracking plug-in monitors the changes and produces a record of the changes in a change set, which may be represented in a data structure. In one embodiment, the change set is stored as auxiliary data structures associated with OpenAccess. In another embodiment, the change set is stored as an application-specific set of data structures. In one embodiment, the tracking plug-in directly creates the export format. In another embodiment, the export plug-in converts the description of the changes reflected in the change set to the export format. In one embodiment, the changes are communicated using an XML format. In another embodiment, the changes are communicated in a compressed XML format. In a further embodiment, the changes are communicated in an application-specific format. Other formats or protocols are also possible for exporting At 140, the application calls the API to synchronize its data models with the data models of another application process. In one embodiment, the synchronization is performed automatically. In another embodiment, a user explicitly specifies when the changes are to be exported. The synchronization may be performed as desired by the system for the best allocation of resources as desired.

Figure 2:
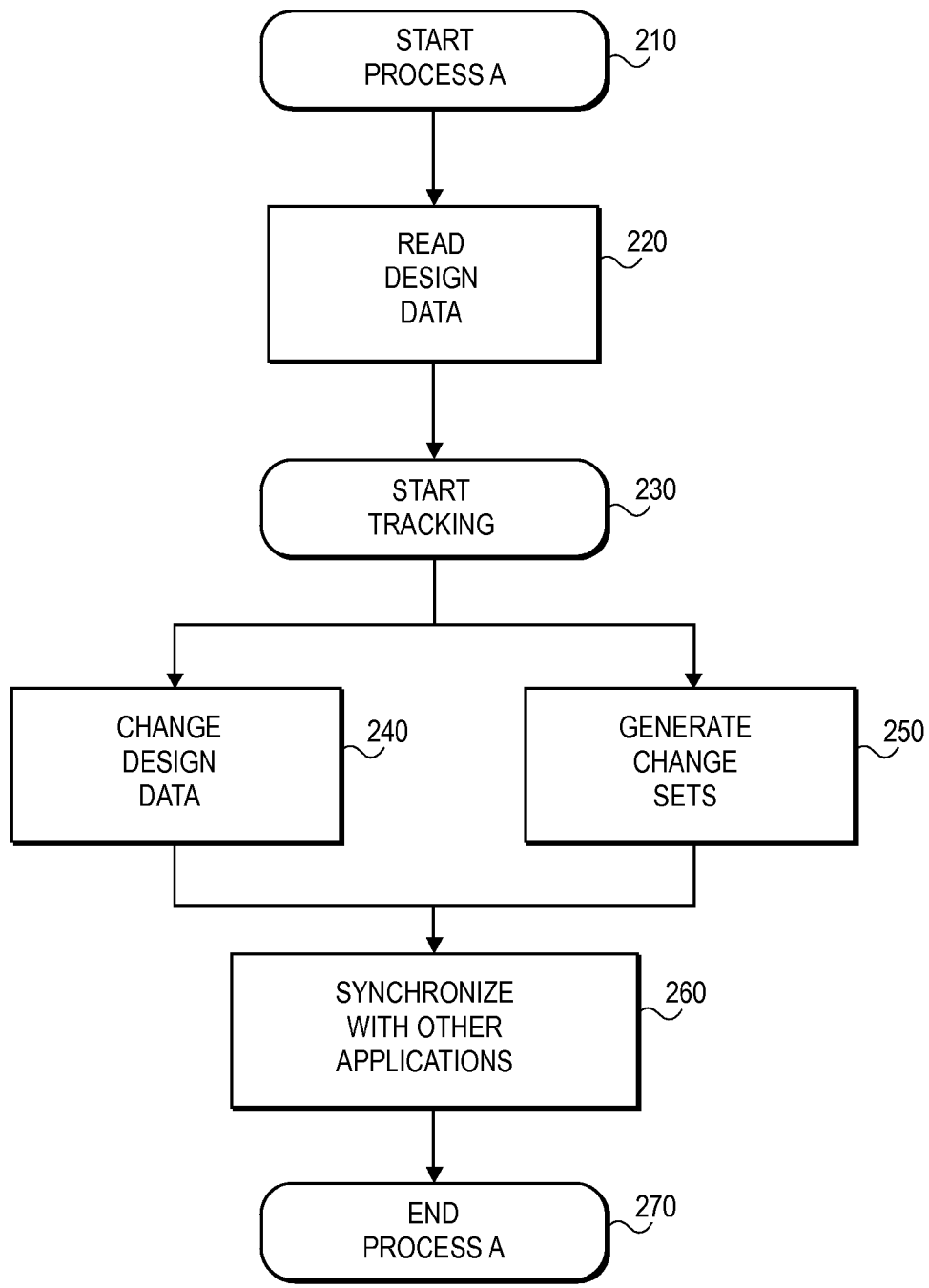
FIG. 2 shows a flowchart of a process for synchronizing changes according to an embodiment of the invention.

FIG. 2 shows a flowchart of a process for synchronizing changes according to an embodiment of the invention. The flowchart illustrates the actions involved in one application process to synchronize with other applications.

At 210, process A starts. In some embodiments, the process calls the peer-to-peer APIs and communicates information with other processes of other applications as desired. In one embodiment, the communication includes control information such as inter-process communications (IPC) in the SKILL language. In another embodiment, C language is used. Other languages can also be used. This peer-to-peer communications allows for sending user level commands from one application to another.

At 220, design data is read into memory. The design data provides the required information for performing the process.

At 230, the process of tracking changes starts. This action prepares the system to synchronize design data with other processes. In one embodiment, a user activates the synchronization process. In another embodiment, the application of process A determines when to start tracking based on the relative complexity and amount of changes to the design data. Usually this process is most beneficial when the changes involved are relatively small. For example, changes of less than 50% to the data models.

Actions 240 and 250 occur in parallel. At 240, the process A makes some changes to the design data. For example, changes include inserting a buffer, increasing the size of a transistor, or rerouting a net. In response to changes in 240, action 250 generates the change sets as the changes of 240 are tracked and recorded.

In one embodiment, design and technology data are tracked. Other data of interest may also be tracked. When applications maintain their own data structures with additional information related to the design, the effect of changes to the design on the application's data structures can be tracked. It is also possible to track other changes to the application's data structures that are not a consequence of changes to the design.

In one embodiment, the change sets are represented using auxiliary data structures. In another embodiment, the change sets are represented as application-specific data structures. In another embodiment, the change sets are converted by the tracking plug-in directly into the format that will be transmitted by the export plug-in. Any desired information and/or format may be used in generating the change sets.

At 250, the tracking plug-in records the changes as change records. For each change that occurs at 240, that change is recorded and stored in a change set of 250.

At 260, the design data are synchronized with other applications. In some embodiments, the change set is provided to the export plug-in, which modifies the changes to a format capable of being communicated and received by the other applications. In an embodiment, the export plug-in loads a set of translation information. The export plug-in converts the change records (e.g., data structure) into export format (e.g., XML). In response to the API call to export the changes, the export plug-in transmits XML, which is then sent to other applications.

In a further embodiment, the synchronization process also determines the format and protocol of the design data that has to be exported. In another embodiment, the export plug-in converts the change set to a compressed XML format. In another embodiment, the export plug-in provides the change sets without modification. Any desired format may be used for transmission. The received application process will synchronize the data models as described below.

In another embodiment, coordination between the collaborating process on the type of data to be synchronized and the format to be used for export/import occurs before starting to track changes 230. Depending on the format and protocols, the changes may need to be stored in different data structures corresponding to different databases. In some embodiments, there are two things that affect the kinds of changes that are tracked: (1) the design data model supported in the application which is making the changes and (2) the design data supported in the applications that import those changes. The representation of the changes created by the tracking plug-in may reflect the common portion of those data models, regardless of what the representation is (e.g., OpenAccess or proprietary). Similarly, the formats used to export changes to each of the other applications includes all of the changes that are relevant to that application. This embodiment is further described in FIG. 6.

At 270, the process of FIG. 2 ends.

Figure 3:
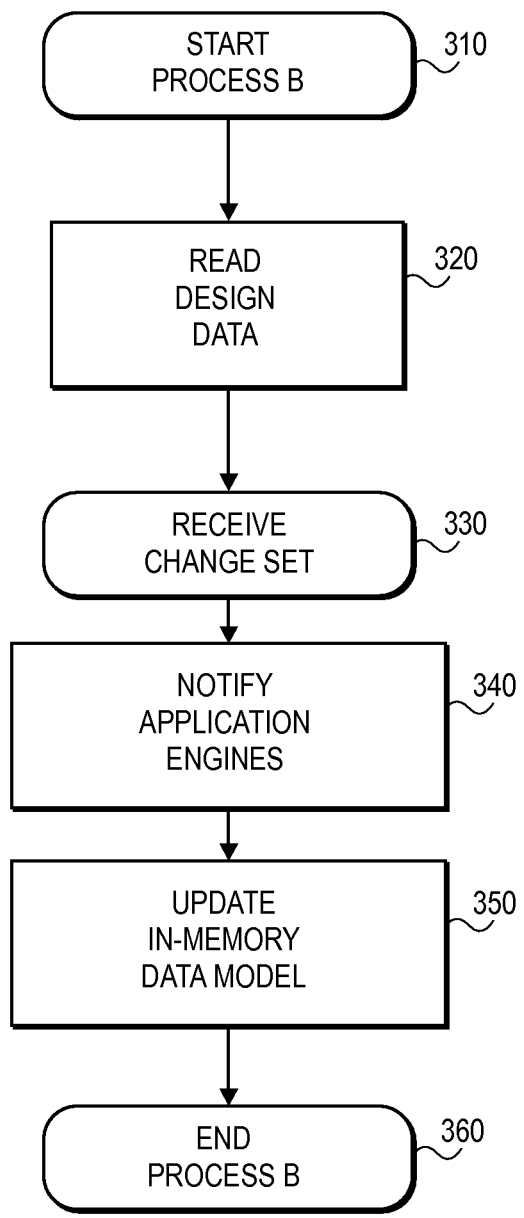
FIG. 3 shows a flowchart of a process for updating changes according to an embodiment of the invention.

FIG. 3 shows a flowchart of a process for updating design data in an application with a set of changes according to an embodiment of the invention.

At 310, process B starts.

At 320, design data is read. In some embodiments, the design data read for process B is described using the same data models as the design data read for process A. In other embodiments, the design data read for process B is described using equivalent but different data models.

At 330, the change sets are received via an import plug-in. In one embodiment, a received change set initiates this updating process. In another embodiment, a user requests this update. In a further embodiment, this process is automatically performed on a periodic basis. Any desired stimuli maybe used to start this updating process.

At 340, the update process calls the API of this application to notify the application engine of process B. This API is a call from the import plug-in to the application to let the application know that changes are available for import, allowing the application to notify the user. In some embodiments, the user is notified that changes are about to be imported. In other embodiments, the changes are queued for later updating. In further embodiments, changes are updated automatically. Other updating options are also possible. These options give the user greater control of the updating process.

At 350, the updating process updates the design data by updating the in-memory data model. In some embodiments, the update process determines the format and protocol of the design data changes that have been received. Depending on the format and protocols, the changes described in the change set may be applied directly to the application's data models, or the changes may first need to be translated into different data structures before they can be applied. In one embodiment, if the data model is OpenAccess, then the change set is converted from an XML representation into auxiliary data structures, and then the changes are applied to OpenAccess. In another embodiment, if the data model is not OpenAccess such as a proprietary data model, then the representation of the change set is interpreted in application-specific ways in order to apply the changes directly to the proprietary data model. In another embodiment, the XML representation of the change set is converted into proprietary data structures and then the changes are applied to a proprietary data model.

In some embodiments, the change set may include changes to several different data models, in which case the update process determines which data models are affected by each change. In some embodiments, the change set representation includes data about which data models are affected. In other embodiments, the updating process determines which data models are affected automatically.

At 360, the updating process for process B ends after the data models at the received site have been changed to include the changes of the sending site.

Figure 4:
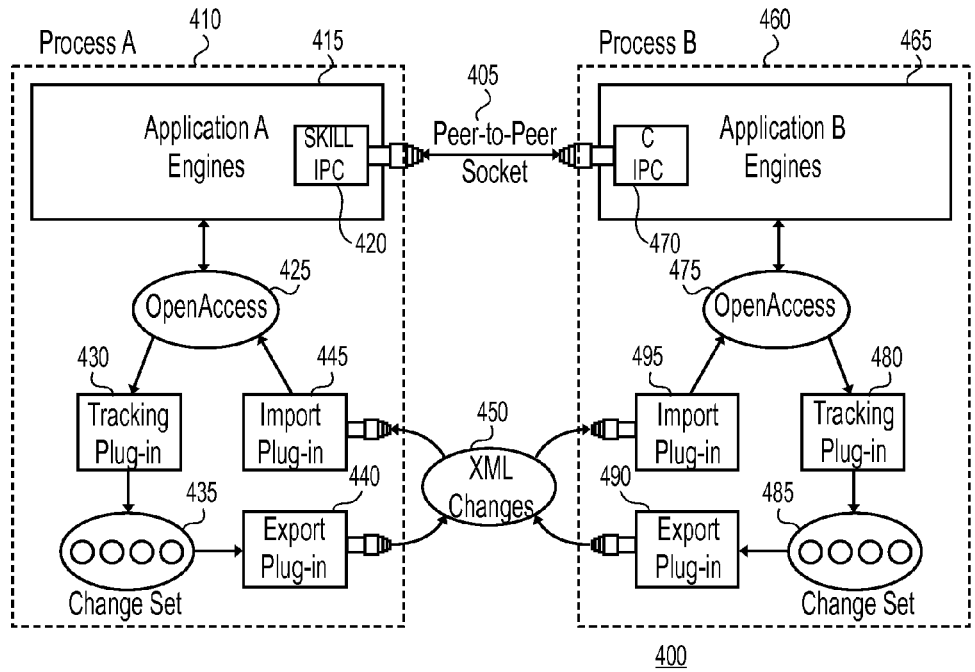
FIG. 4 illustrates an approach for high-speed synchronization according to an embodiment of the invention.

FIG. 4 illustrates an approach for high-speed synchronization 400 according to an embodiment of the invention. In one embodiment, support for tracking, exporting, and importing changes as a set of plug-ins are used to facilitate application process synchronization. This approach facilitates incremental collaboration between multiple applications. In one embodiment, FIG. 4 illustratively shows how two processes can collaborate on a set of changes to an OpenAccess design using a particular combination of plug-ins according to one embodiment of the invention.

FIG. 4 includes Process A 410 and Process B 460. The processes communicate control information via a Peer-to-Peer Socket 405. In one embodiment, the communication allows for distributed processing of a task. In other embodiments, any processes that are related that need information from other processes can use this socket 405.

In process A 410, there are engines for the application A 415, which includes an inter-process communication (IPC) API 420 for communicating with other processes. In one embodiment, the IPC API is provided using the SKILL language. Other computer languages may be used.

Process A also uses an OpenAccess data model database 425. The data models depend on the application engines. Any desired data models may be used.

The Process A 410 also includes a set of plug-ins including a tracking plug-in 430, which creates one or more change sets 435, an export plug-in 440 and an import plug-in 445. The tracking plug-in monitors the OpenAccess data models database for changes. These changes are recorded to form a change set 435. The change set 435 is formatted by the export plug-in 440. In one embodiment, the changes are formatted in XML format. In another embodiment, compression of the information is used. In a further embodiment, the information is encrypted. Any format or modification may be used for transmission to improve speed, quality and security of the transmitted information. The received changes are received via the import plug-in 445. In one embodiment, the received signal is in a compressed XML format. The received changes can be in any desired format. In one embodiment, the changes are updated by the import plug-in. In another embodiment, the import plug-in updates and translates the changes to the OpenAccess data models 425. In some embodiments, the protocol used to transmit the format is flexible (e.g., including sockets, pipes, files, and shared memory).

In one embodiment, the Process B functions substantially similar to Process A. Process B 460 includes engines for application B 465, which includes an inter-process communication (IPC) 470 for communicating with other processes such as Process A. In one embodiment, the IPC uses C language. Other computer languages may be used.

Process B also uses an OpenAccess data model database 475. The data models used depend on the application engines. Any desired data models may be utilized.

The Process B 460 also includes plug-ins having tracking plug-in 480, change set 485, export plug-in 490 and import plug-in 495. The protocol used to transmit the format is flexible as stated above. The tracking plug-in monitors the OpenAccess data model database for changes. These changes are recorded to form a change set 485. The change set 485 is formatted at the export plug-in 490. In one embodiment, the changes are formatted in XML format. In another embodiment, compression of the information is used. In a further embodiment, the information is encrypted. Any format or modification may be used for transmission to improve speed, quality and security of the transmitted information. The received changes are received via the import plug-in 495. In one embodiment, the received signal is in a compressed XML format. The received changes can be in any desired format. In another embodiment, the import plug-in updates and translates, if necessary, the changes to the OpenAccess data models 475.

At connection 450, changes tracked from Process A 410 are transmitted to Process B 460, and changes tracked from Process B is transmitted to Process A. In one embodiment, the connection is a wired connection. In another embodiment, the connection is a wireless connection. Any transmission medium maybe involve in the transmission of the changes.

In this embodiment, Applications A and B are incrementally collaborating using the same plug-in implementations for Tracking, Importing, and Exporting changes. As changes are made to the copy of the OpenAccess database for a design in Process A, the Tracking Plug-in in Process A builds a Change Set data structure. Periodically, or under user control, the Export Plug-in in Process A sends those changes over a socket connection using a highly compressed XML format to the Import Plug-in in Process B. An important aspect is that Process A and Process B can be running either on the same machine or on different machines.

The Import Plug-in in Process B interprets the XML description of the changes and makes corresponding changes to the copy of the OpenAccess database for the same design in Process B. Once the changes have been applied, both processes see a consistent view of the current state of the design. In addition, both processes know which parts of the design have changed, and that knowledge can be used to speed up subsequent operations by focusing just on the parts of the design impacted by those changes.

The synchronization capability is symmetric, supporting changes made by Application B as well as changes made by Application A. When Application B makes changes, the Tracking Plug-in in Process B builds a Change Set data structure. Periodically, or under user control, the Export Plug-in in Process B sends those changes over a socket connection using the highly compressed XML format to the Import Plug-in in Process A. The Import Plug-in in Process A interprets the XML description of the changes and makes corresponding changes to the copy of the OpenAccess database for the same design in Process A.

In another embodiment, the synchronization process includes the ability to control when changes are synchronized. In an interactive application, it is common for users to make a number of changes, and then decide to undo some or all of the changes. For example, it can be more efficient to accumulate changes locally in an application and only export those changes when the user explicitly requests them. Different Application Programming Interfaces (APIs) can be provided for the Peer-to-Peer Socket. As shown above, the APIs can be for any computer languages such as for both the SKILL and C languages.

In another embodiment, the synchronization process provides flexibility in the format and protocol used for communicating changes. For example, the use of Import and Export plug-ins allows other formats and protocols to be used. A different implementation of the plug-ins can be substituted at run time with no other changes to Application A or B, enabling many possibilities. In one embodiment, an uncompressed XML format based on the names of objects in the design is used rather than more compact identifiers used only within the OpenAccess representation. This allows synchronization of changes to other in-memory representations besides OpenAccess. In another embodiment, encryption to protect the changes from unauthorized use is incorporated in the process. In a further embodiment, a file, a pipe, or shared memory is used as the protocol. In another embodiment, debugging capabilities provides the ability to trace the full sequence of changes made across all of the applications.

Figure 5:
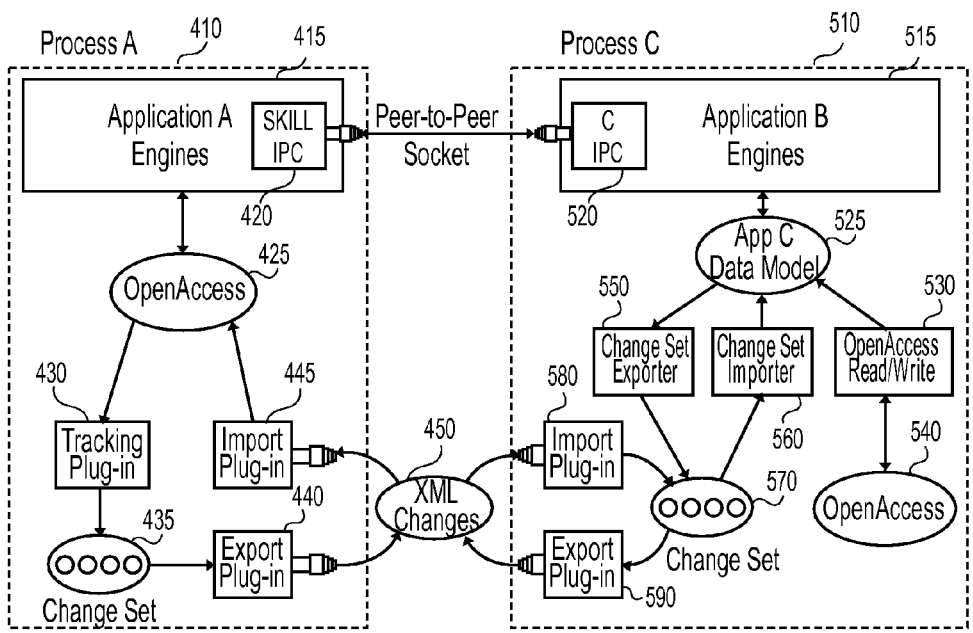
FIG. 5 illustrates an approach for synchronizing other design representations according to an embodiment of the invention.

FIG. 5 illustrates an approach for synchronizing other design representations according to an embodiment of the invention. In one embodiment, the approach of FIG. 5 synchronizes Process A 410 with Process C 510, where Application C reads an OpenAccess database from disk, but converts it into its own in-memory data model. This embodiment provides flexibility in the representations of the design data used by each process.

Control information is communicated between the processes using a peer-to-peer socket 505.

Process A 410 of the embodiment of FIG. 4 is equivalent to the Process A of the embodiment of FIG. 5; however, in this embodiment, process A 410 is synchronizing with Process C 510.

Process C 510 includes Application C engines 515. In one embodiment, the engines include a C language IPC API similar to the IPC API 470 of FIG. 4. Other computer languages and/or IPC APIs may be used.

Process C also includes an App C data model 525, OpenAccess (OA) database 540, OA read/write 530, change set exporter 550, change set importer 560, change set 570, export plug-in 580 and import plug-in 590.

The data model 525 communicates bidirectionally with the Application engines 515. The model 525 receives changes made by the application engines 515 and also provides data model information to the engines 515. The data model 525 also receives information regarding OA information from 530. The model 525 provides data changes to the change set exporter 550 and receives information from the change set importer 560.

The OA read/write 530 reads and writes information to the OA database 540 and provides the OA information to the data model 525. This allows either Process A or Process B to write out all of the changes made in the session, regardless of which application made each change.

The OpenAccess database 540 is substantially similar to the OA database 425. It may include OA data models required by certain application engines. The two databases should be semantically identical whenever a given round of synchronization has been completed, and the OA read/write 530 has converted 525 into the corresponding 540 representation.

The change set exporter 550 receives the change information from the in-memory data model. The exporter 550 translates the change information into the change set data structures supported by the export plug-in 580.

The change set importer 560 receives the change set in OA format and using relevant information from the OA database, translates and applies the received changes to the in-memory data model.

The change set 570 represents a plurality of changes from the exporter where the changes are grouped and transmitted to the export plug-in 580. The change set 570 also receives the change set from import plug-in 590 and the changes are provided to the change set importer 560. In one embodiment, at a given point in time, the change set represents either changes that have been made by Process C which need to be exported by 580 to Process A or changes that have been made by Process A which have been imported and need to be applied to 525. In other embodiments, separate change sets are maintained for changes being imported and for changes being exported.

The export plug-in 580 receives the change set in OA format and transmits it in XML. The import plug-in 590 receives changes from the connection 450 and provides the change set 570 to Process C 510. The export and import plug-ins 580, 590 functions substantially similar to the export and import plug-ins 440, 445 of Process A 410.

In this embodiment, the Engines in Application C interact with Application C's in-memory data model, rather than interacting directly with the OpenAccess in-memory model. For the Engines in Application A to collaborate incrementally with the Engines in Application C, changes need to be synchronized to and from Application C's in-memory data model. The embodiment covers this case by allowing different implementations of the Import and Export Plug-ins in each process, and by allowing different formats for communicating the changes.

In another embodiment, it is better to communicate changes using a name-based XML representation, rather than an XML representation based on identifiers used internally by OpenAccess. This ensures that the corresponding objects can be found in both the OpenAccess in-memory data model and Application C's data model. However, using the plug-in architecture allows Application A to collaborate incrementally with both Application B (e.g., from FIG. 4) and Application C (e.g., from FIG. 5) without making any changes to Application A. Instead, it simply chooses an appropriate plug-in at run-time. The invention also includes support for synchronizing between all three applications simultaneously, using both the name-based and OpenAccess identifier versions of the XML format. Although the figures show a single Import and Export plug-in in each process, it is possible to support multiple Import and Export plug-ins, one for each synchronization format or protocol.

In an embodiment, the synchronization process includes controlling which application is allowed to make changes at a given time. When several applications are collaborating in a session, either the peer-to-peer socket interface or the XML format can be used to coordinate when changes are allowed, as well as when to import or export the changes. One embodiment of this approach is to treat the right to change the design as a token which gets passed between the applications. Only the application that currently holds the token is allowed to make changes; when that application is finished making changes, it releases the token, which can then be requested by any of the applications.

Figure 6:
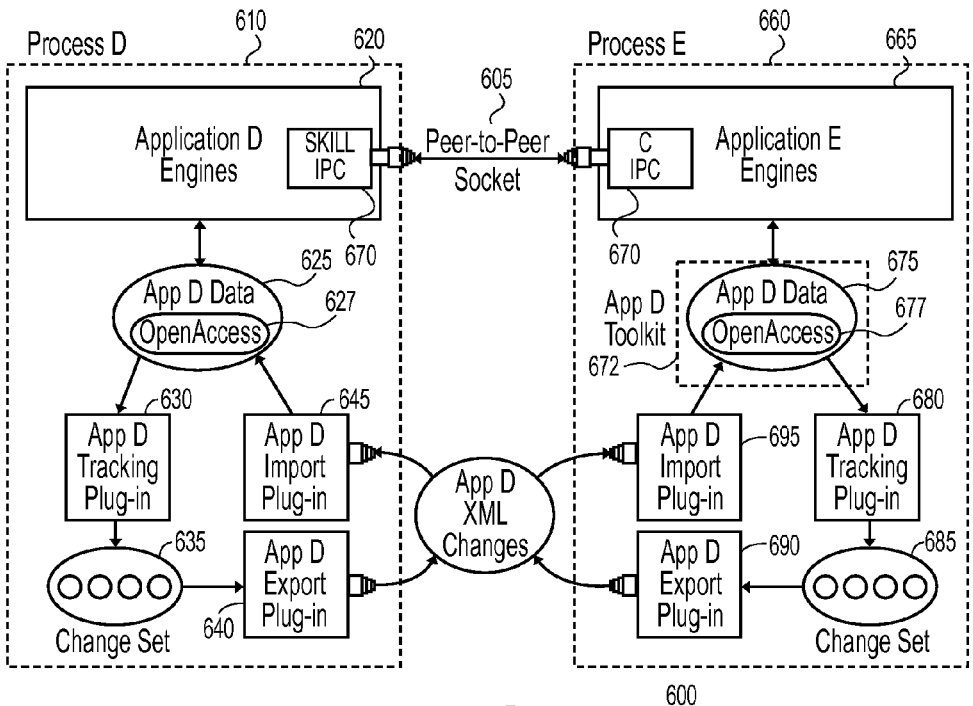
FIG. 6 illustrates an approach for synchronizing multiple data models according to an embodiment of the invention.

FIG. 6 illustrates an approach for synchronizing multiple data models according to an embodiment of the invention. In one embodiment, the approach includes incrementally synchronizing a mixture of changes to several different data models used within each application.

In FIG. 6, Application D 615 and Application E 665 are incrementally collaborating on changes to two data models: the OpenAccess data model and an additional data model defined by Application D. In this example, Application D's data model is layered on top of the OpenAccess data model, but the embodiment also supports other relationships between the data models, including the case where there is no relationship between the models.

To support this extended collaboration, Application D provides enhanced versions of the Tracking, Import, and Export plug-ins, as well as the XML format, covering both changes to OpenAccess and changes to Application D's data model.

The approach of FIG. 6 includes Process D 610 and Process E 660. The processes communicate control information via a Peer-to-Peer Socket 605. In one embodiment, the communication allows for distributed processing of a task. In other embodiments, any processes that are related that need information from other processes can use this socket 605.

In process D 610, there are engines for the application D 615, which includes an inter-process communication (IPC) API 620 for communicating with other processes. In one embodiment, the IPC API uses SKILL language. Other computer languages may be used. In another embodiment, the process of FIG. 6 is substantially similar to the process described by FIG. 1.

Process D also uses an OpenAccess data model database 625 along with an in-memory data model 627. The two data models may work together in providing data models to the application engines. The relationship between the data models depends on the process and the user. The data model relationships depend on the application engines. In one embodiment, the data model is an application D data model. Any desired data models may be used.

The Process D 610 also includes application D plug-ins having application D tracking plug-in 630, application D change set 635, application D export plug-in 640 and application D import plug-in 645. The tracking plug-in monitors the OpenAccess data models database for changes. These changes are recorded to form the application D change set 635. The application D change set 635 is formatted at the application D export plug-in 640. In one embodiment, the changes are formatted in XML format. In another embodiment, compression of the information is used. In a further embodiment, the information is encrypted. Any format or modification may be used for transmission to improve speed, quality and security of the transmitted information. The received changes are received via the application D import plug-in 445. In one embodiment, the received signal is in a compressed XML format. The received changes can be in any desired format. In another embodiment, the application D import plug-in updates and translates, if necessary, the changes to the data models 625, 627.

In one embodiment, the Process E functions substantially similar to Process D. In process E 660, there are engines for the application E 665, which includes an inter-process communication (IPC) 670 for communicating with other processes. In one embodiment, the IPC uses C language. Other computer languages may be used.

Process E also uses an application D Toolkit 672. The toolkit includes an OpenAccess data model 675 and application D data model 677. The two data models may work together in providing data models to the application engines.

The relationship between the data models depends on the processes and the user. The data models used depend on the application engines. Any desired data models may be utilized.

The Process E 660 also includes application D plug-ins having application D tracking plug-in 680, change set 685, export plug-in 690 and import plug-in 695. The tracking plug-in monitors the OpenAccess data models database for changes. These changes are recorded to form the application D change set 685. The change set 685 is formatted at the application D export plug-in 690. In one embodiment, the changes are formatted in XML format. In another embodiment, compression of the information is used. In a further embodiment, the information is encrypted. Any format or modification may be used for transmission to improve speed, quality and security of the transmitted information. The received changes are received via the application D import plug-in 695. In one embodiment, the received signal is in a compressed XML format. The received changes can be in any desired format. In some embodiments, the import plug-in updates and translates, if necessary, the changes to the OpenAccess data models 675.

At connection 650, changes tracked from Process D 610 are transmitted to Process E 660, and changes tracked from Process E are transmitted to Process D. In one embodiment, the connection is a wired connection. In another embodiment, the connection is a wireless connection. Any transmission medium maybe involve in the transmission of the changes.

Figure 7:
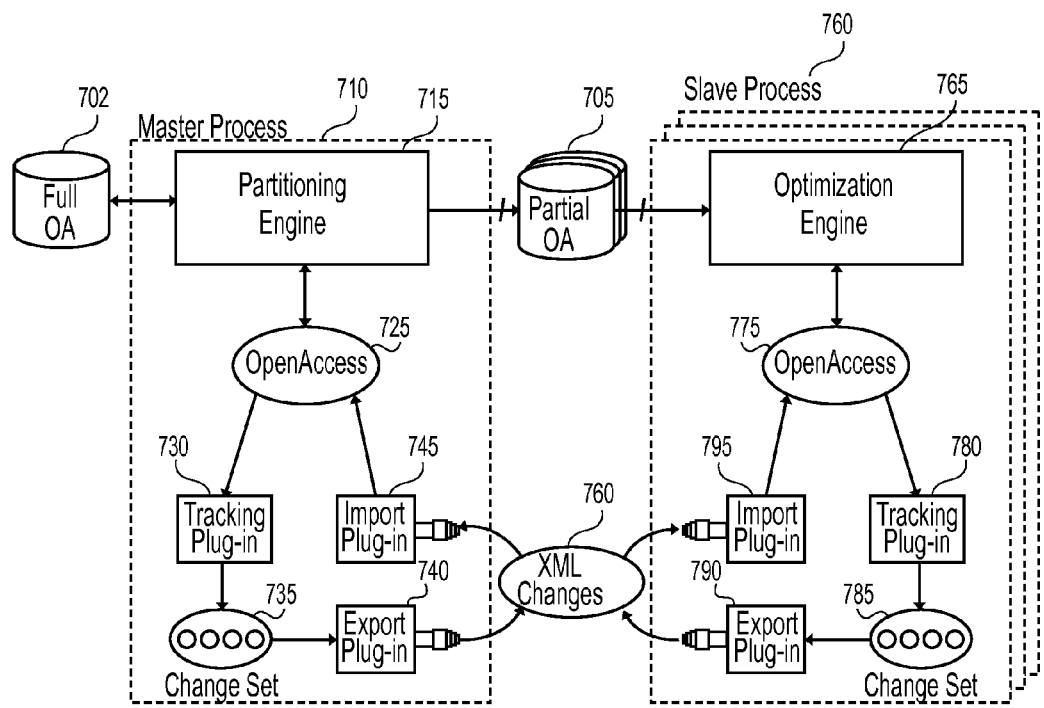
FIG. 7 illustrates an approach for synchronizing master and slave processes according to an embodiment of the invention.

FIG. 7 illustrates an approach for synchronizing master and slave processes according to an embodiment of the invention. In one embodiment, the processes support for synchronizing changes among a set of distributed applications.

In FIG. 7, a Master Process 710 is used to partition a problem into pieces that can be distributed to a set of Slave Processes 760. The Master and Slave Processes can be run on the same or different machines. In an embodiment, the Master Process reads a Full OpenAccess database from disk 702 and writes a partial OpenAccess database for each Slave Process 705. In one embodiment, each partial database contains a subset of the layers used to implement the design. In another embodiment, each partial database contains just the physical implementation for a particular region of the chip. In a further embodiment, each partial database contains some other type of partitioning of the Full OA database. Other partitioning strategies may be employed.

As the Slave Processes 760 make changes to their subset of the design, the changes can be exported back to the Master Process 710 to be reflected in an updated view of the whole design. Each Slave Process can also import changes from any other Slave Process or from the Master Process 710, which can be useful when the partitions are not completely disjoint.

In one embodiment, the synchronization of master and slave processes includes a master process 710 including a partitioning engine 715, an OpenAccess (OA) database 725, a tracking plug-in 730, a change set 735, an export plug-in 740, and an import plug-in 745.

The master process 710 is substantially similar to Process A. In one embodiment, one difference is that Application A Engines includes a Partitioning Engine in the Master Process 710. The partitioning engine can be one of several application engines supported in the master process, allowing the master process to be used by it, as well as in a distributed mode. Alternatively, the master process may be a specialized application which does nothing except partitioning and coordinate the distributed process.

The embodiment also includes a plurality of slave processes that communicates with the master process via communications path 705 that includes a plurality of partial OA databases. Each slave process includes an OpenAccess (OA) database 775, a tracking plug-in 780, a change set 785, an export plug-in 790, and an import plug-in 795.

The OA data model 775 communicates bidirectionally with the optimization engine 765. The OA data model 775 receives changes made by the optimization engine 765 and also provides data model information to the engine 765.

The tracking plug-in 780 receives the change information from the OA data model. The change set 785 receives a plurality of changes from the tracking plug-in 780, where the changes are grouped and transmitted to the export plug-in 580.

The import plug-in 795 receives the change set in XML format and translates and provides the received changes in a compatible format for the OA data model. The export plug-in 790 receives the change set in OA format and transmits it in XML. The export and import plug-ins 795, 590 functions substantially similar to the export and import plug-ins 440, 445 of Process A 410.

Figure 8:
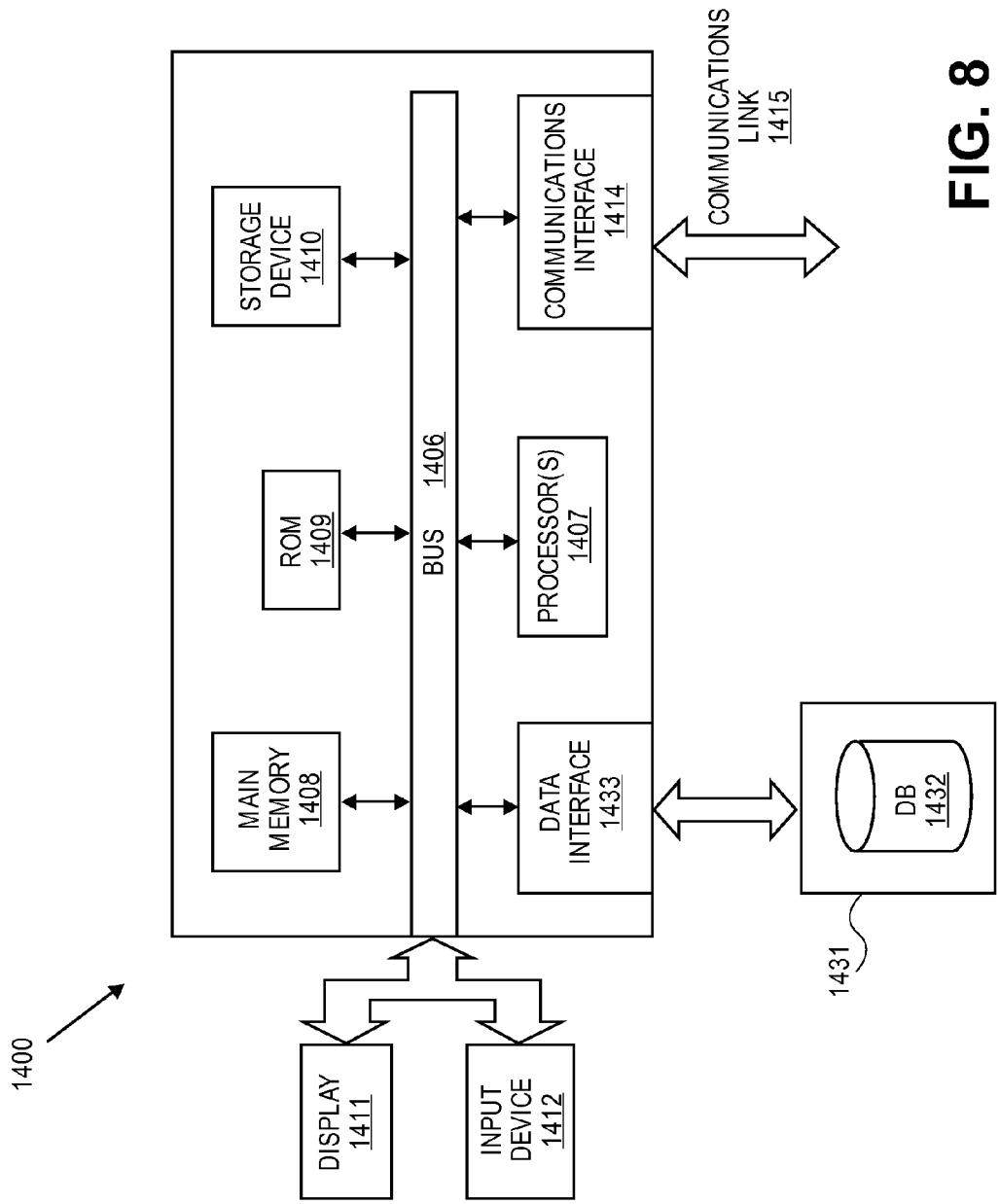
FIG. 8 shows architecture for implementing a synchronization mechanism according to an embodiment of the invention.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM. EPROM, FLASH-EPROM, any other memory chip or cartridge, carrier wave, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than in a restrictive sense.

What is claimed is:

1. A method for synchronizing multiple applications in a distributed system comprising:
   using at least one processor to perform a process, the process comprising:
   making a change to a design by using an electronic circuit design tool, wherein design data for implementing the design are stored in a design database;
   tracking the change to a first data model of a first process of one of the multiple applications associated with the design, wherein the first process interacts with the first data model, rather than the design database or a first copy of the design database, to implement the design;
   generating a change set representation from the change that is tracked; and
   updating a second data model of a second process at another one of the multiple applications, wherein
   the second data model is updated with the change set representation regardless of whether a uniform data model that is supported by the multiple applications exists.

2. The method of claim 1, further comprising incrementally synchronizing several different representations to reflect one or more changes made to any of those representations.

3. The method of claim 1, wherein a first format of the first data model of the process is different than a second format of the second data model of another process.

4. The method of claim 1, further comprising partitioning the design and operating some of the processes on a subset of the design.

5. The method of claim 1, further comprising tracking the change by a standalone application.

6. The method of claim 1, further comprising tracking the change made to a version of the design and applying the changes to a different version of the design.

7. The method of claim 1, wherein a tracking plug-in accumulates a set of changes representing each change as an in-memory data structure.

8. A non-transitory computer-readable medium carrying one or more sequences of instructions for synchronizing multiple applications in a distributed system, wherein execution of the one or more sequences of instructions by one or more processors causes the one or more processors to perform the process, the process comprising:
   making a change to a design, wherein design data for implementing the design are stored in a design database;
   tracking the change to a first data model of a first process of one of the multiple applications associated with the design, wherein the first process interacts with the first data model, rather than the design database or a first copy of the design database, to implement the design;
   generating a change set representation from the change that is tracked; and
   updating a second data model of a second process at another one of the multiple applications, wherein
   the second data model is updated with the change set representation regardless of whether a uniform data model that is supported by any application of the multiple applications exists.

9. The computer-readable medium of claim 8, further comprising incrementally synchronizing several different representations to reflect one or more changes made to any of those representations.

10. The computer-readable medium of claim 8, further comprises collaborating on at least some of the one or more changes to a partitioned design.

11. The computer-readable medium of claim 8, further comprises tracking the change made by a standalone application.

12. The computer-readable medium of claim 8, further comprising:
    tracking the change made to a version of the design; and
    applying the change to a different version of the design.

13. The computer-readable medium of claim 8, further comprises:
    accumulating a set of changes; and
    representing each change as an in-memory data structure.

14. An apparatus for synchronizing multiple applications in a distributed system, the apparatus comprising:
    at least one processor that is to:
    make a change to a design, wherein design data for implementing the design are stored in a design database;
    track the change to a first data model of a first process of one of the multiple applications associated with the design, wherein the first process interacts with the first data model, rather than the design database or a first copy of the design database, to implement the design;
    generate a change set representation from the change that is tracked; and
    update a second data model of a second process at another one of the multiple applications, wherein
    the second data model is updated with the change set representation regardless of whether a uniform data model that is supported by any application of the multiple applications exists.

15. The apparatus of claim 14, in which the at least one processor is further to incrementally synchronize several different representations to reflect one or more changes made to any of those representations.

16. The apparatus of claim 14, wherein a first format of the data model of the process is different than a second format of the in-memory data model of another process.

17. The apparatus of claim 14, in which the at least one processor is further to collaborate on one or more changes to a partitioned design.

18. The apparatus of claim 14, in which the at least one processor is further to track one or more changes by a standalone application.

19. The apparatus of claim 14, in which the at least one processor is further to track one or more changes made to a version of the design and to apply to a different version of the design.

20. The apparatus of claim 14, in which the at least one processor is further to accumulate a set of changes and to represent each change of the set of changes as an in-memory data structure.

* * * * *